US007424472B2

(12) United States Patent
Wang et al.

(10) Patent No.: US 7,424,472 B2
(45) Date of Patent: Sep. 9, 2008

(54) SEARCH QUERY DOMINANT LOCATION DETECTION

(75) Inventors: Chuang Wang, Beijing (CN); Joshua Forman, Somerville, MA (US); Lee Wang, Kirkland, WA (US); Xing Xie, Beijing (CN); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 11/138,685

(22) Filed: May 27, 2005

(65) Prior Publication Data

US 2006/0271518 A1 Nov. 30, 2006

(51) Int. Cl.
*G06F 7/00* (2006.01)
*G06F 17/30* (2006.01)

(52) U.S. Cl. .............................. 707/4; 707/3; 715/200
(58) Field of Classification Search ................ 707/4, 707/5, 3, 102, 101
See application file for complete search history.

(56) References Cited

U.S. PATENT DOCUMENTS

| | | | | | |
|---|---|---|---|---|---|
| 5,454,106 | A | * | 9/1995 | Burns et al. ................... 707/4 |
| 5,577,249 | A | * | 11/1996 | Califano ...................... 707/100 |
| 5,794,177 | A | * | 8/1998 | Carus et al. ................... 704/9 |
| 5,862,374 | A | * | 1/1999 | Purcell ........................ 707/6 |
| 5,890,103 | A | * | 3/1999 | Carus .......................... 704/9 |
| 6,366,956 | B1 | * | 4/2002 | Krishnan .................... 709/223 |
| 7,089,319 | B2 | * | 8/2006 | Lysenko et al. ............ 709/231 |
| 7,117,201 | B2 | * | 10/2006 | Kuno et al. ................... 707/3 |
| 7,162,473 | B2 | * | 1/2007 | Dumais et al. ................ 707/5 |
| 7,225,232 | B2 | * | 5/2007 | Elberse ....................... 709/206 |
| 7,266,553 | B1 | * | 9/2007 | Anderson et al. ............. 707/5 |
| 2002/0046208 | A1 | * | 4/2002 | Andersson et al. ............ 707/3 |
| 2002/0157020 | A1 | * | 10/2002 | Royer ......................... 713/201 |
| 2003/0069880 | A1 | * | 4/2003 | Harrison et al. ............... 707/3 |
| 2003/0135826 | A1 | * | 7/2003 | Dozier ....................... 715/515 |
| 2003/0158839 | A1 | * | 8/2003 | Faybishenko et al. .......... 707/3 |
| 2004/0267700 | A1 | * | 12/2004 | Dumais et al. ................. 707/2 |
| 2005/0065959 | A1 | * | 3/2005 | Smith et al. ................. 707/102 |
| 2005/0144158 | A1 | * | 6/2005 | Capper et al. ................. 707/3 |
| 2005/0198070 | A1 | * | 9/2005 | Lowry ..................... 707/104.1 |
| 2005/0228780 | A1 | * | 10/2005 | Diab et al. .................... 707/3 |
| 2005/0262062 | A1 | * | 11/2005 | Xia ............................. 707/3 |
| 2006/0036568 | A1 | * | 2/2006 | Moore et al. ................... 707/1 |
| 2006/0074883 | A1 | * | 4/2006 | Teevan et al. ................. 707/3 |
| 2006/0106778 | A1 | * | 5/2006 | Baldwin ....................... 707/3 |
| 2006/0224579 | A1 | * | 10/2006 | Zheng .......................... 707/5 |

(Continued)

*Primary Examiner*—Mohammad Ali
*Assistant Examiner*—Mohammed R Uddin
(74) *Attorney, Agent, or Firm*—Shook, Hardy & Bacon LLP

(57) ABSTRACT

A system and method for location-specific searching. The invention correctly identifies explicit and implicit locations in a search query, and provides an appropriate dominant location. Top search results are obtained and analyzed to determine which terms in the query often appear in combination, and the query is tokenized based on the analysis. An explicit location indicating a location intent is most likely treated as an individual token, and the explicit location is treated as the dominant location of the query. In the case of a false positive, wherein the explicit location in a query is not the location intent, the explicit location is likely to be present with other terms that provide context. A token will likely include these terms together. The explicit location will therefore not be used to generate location-specific results in the case of a false positive.

9 Claims, 5 Drawing Sheets

U.S. PATENT DOCUMENTS

2006/0224938 A1* 10/2006 Fikes et al. .................. 715/500
2006/0253439 A1* 11/2006 Ren et al. ...................... 707/5
2007/0100653 A1*  5/2007 Ramer et al. .................. 705/1
2007/0112761 A1*  5/2007 Xu et al. ........................ 707/5
2007/0203869 A1*  8/2007 Ramsey et al. ................ 706/52
2008/0005106 A1*  1/2008 Schumacher et al. ........... 707/6

* cited by examiner

SEARCH QUERY DOMINANT LOCATION DETECTION

CROSS-REFERENCE TO RELATED APPLICATIONS

None.

STATEMENT REGARDING FEDERALLY SPONSORED RESEARCH OR DEVELOPMENT

None.

BACKGROUND

Computer users today are able to access large amounts of information over the Internet and other networks. In order to obtain information over a network, computer users often utilize search engines, which are generally computer programs that are used to access databases of information in response to queries submitted by users.

Often, a computer user may wish to obtain information that is related to a particular geographical area or other physical location, known as a "location intent." For example, a user may wish to obtain information regarding restaurants in Seattle, the location intent. In this case, a user might enter a query such as "Seattle Restaurant." The search engine may recognize the term "Seattle" as a geographical area, and may thus return to the user a list of web pages for restaurants based in Seattle.

However, this technique suffers from several drawbacks. Depending on the information sought and the specific wording of the query, both false negatives and false positives are possible.

There are two types of search queries with location intent. One may contain an "explicit location," where a geographical name presents in the query. For example, the term "Seattle" in the query "Seattle Restaurant" is an explicit location. However, a explicit location in a query may or may not be the actual location intent of the query. False positive cases may exist, wherein the explicit location in a query is not the location intent. For example, "Indiana" is the explicit location of the query "Indiana Jones" but it is not the location intent.

A second type of search query with location intent may contain an "implicit location." Such a search query does not contain a location name at all in itself, but is nonetheless associated with a location intent. The query of "restaurant around Space Needle" is an example of a query with an implicit location, where the query does not explicitly contain any qualified geographical location name. However, this search query implies by the context that user is searching for restaurants in downtown Seattle by using the term "around Space Needle." In the case of an implicit location, a search engine may provide incorrect results, such as, for example, by failing to identify the location intent. Continuing the example given above, because the search engine does not recognize a location name in the search query "restaurant around Space Needle," the search engine does not recognize a location intent. This is an example of a false negative: a location intent in the query is ignored when generating search results.

An existing method of providing location-specific results determines the physical location of a user making a query, for example, by performing a reverse Internet Protocol (IP) lookup. The user's location is then used to generate location-specific search results. However, this method also suffers from drawbacks. In particular, search results are always based on the location of the user's computer. Thus, a user planning a vacation in another part of the country, performing general research, or simply searching for locations across town may not be provided with the desired results.

The "dominant location" of a query is one or more geographical locations associated with the query in collective human knowledge. A dominant location is, for example, a prominent location that is agreed upon by a majority of people who know the answer to the query.

If a query has a dominant location, it may be used as the location intent for that query. However, detecting a dominant location is difficult because it is a subjective and collective measure: it is the location existing in the collective human knowledge.

SUMMARY

In various embodiments, a system and method for correctly identifying a location intent in response to queries containing explicit and implicit locations are provided. The system and method may be used to which facilitate providing appropriate search results in each of these cases.

Web pages can be looked at as a collection of human knowledge, and a good search engine returns top results that include the most relevant and popular usage of, or answer to, a search query. Thus, the top search results may be used as an approximation of the majority opinion to the answer of the query. Search results may therefore be analyzed to find a dominant location of a query.

A method for performing a search may include receiving a query, breaking the query into one or more tokens, and determining whether one of the tokens is an explicit location. The method may further include, if one of the tokens is an explicit location, returning the explicit location as a dominant location for the query.

A method for tokenizing a query may include receiving a query, receiving search results based on the query, and analyzing the search results to determine the frequency of one or more tokens in the search results. The method may further include creating a tokenized query based on the analysis of the search results, the tokenized query including at least one token, and the union of the tokens in the tokenized query being equivalent to the query.

A computer-based system for performing a location-based search may include a first module configured to receive a query and a second module configured to break the query into one or more tokens. The system may also include a third module configured to determine whether one or more of the tokens is an explicit location, and a fourth module configured to determine whether the query contains an implicit location.

BRIEF DESCRIPTION OF THE DRAWINGS

The present invention is described in detail below with reference to the attached drawings figures, wherein.

DETAILED DESCRIPTION

In one implementation, the invention relates to a system and method for correctly identifying a location intent in response to explicit, implicit, and false locations entered in the query, and for providing appropriate search results in each of these cases.

Figure 1:
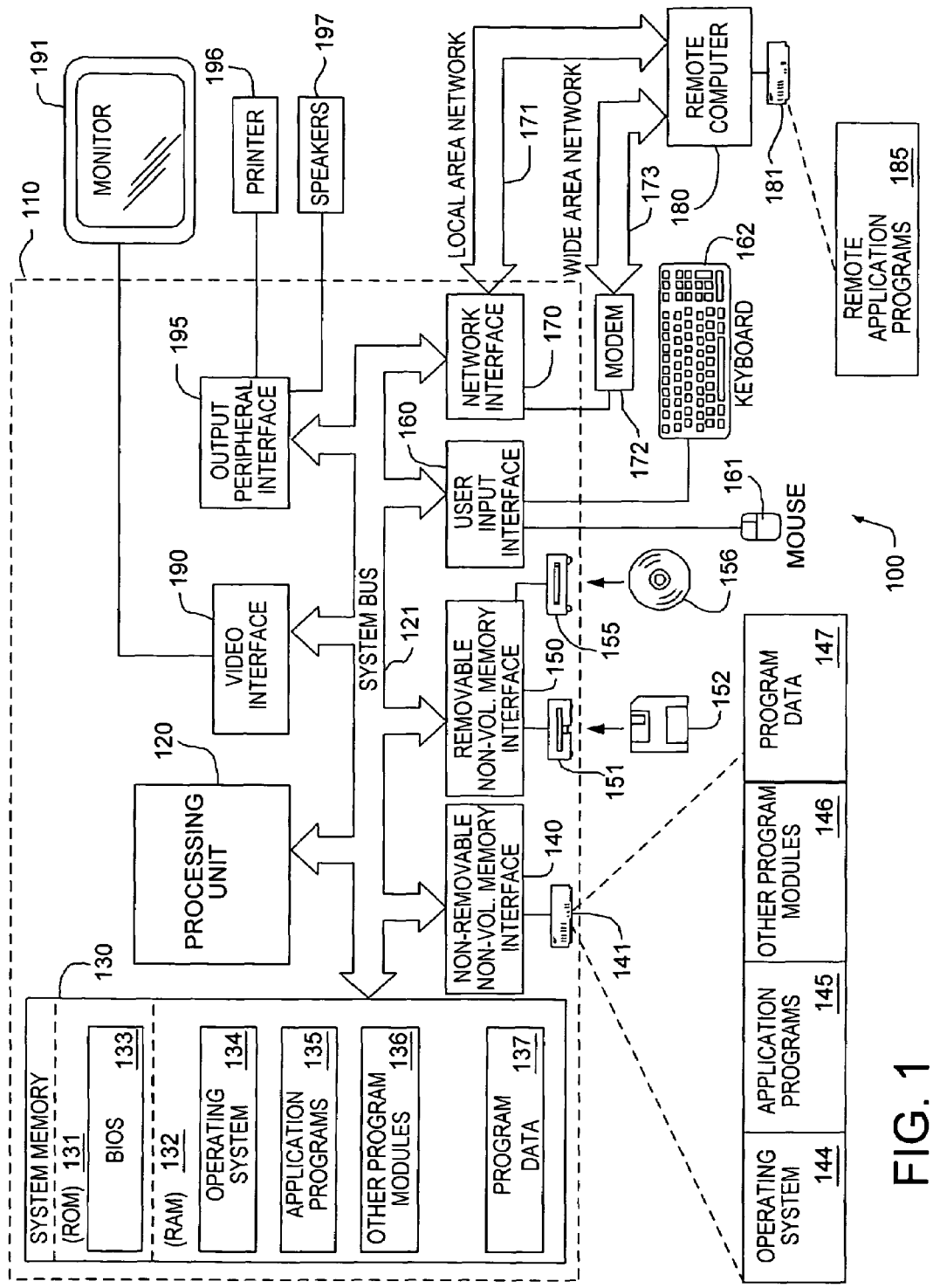
FIG. 1 is block diagram illustrating a computerized environment in which embodiments of the invention may be implemented.

FIG. 1 illustrates an example of a suitable computing system environment 100 on which the system for URL virtualization may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
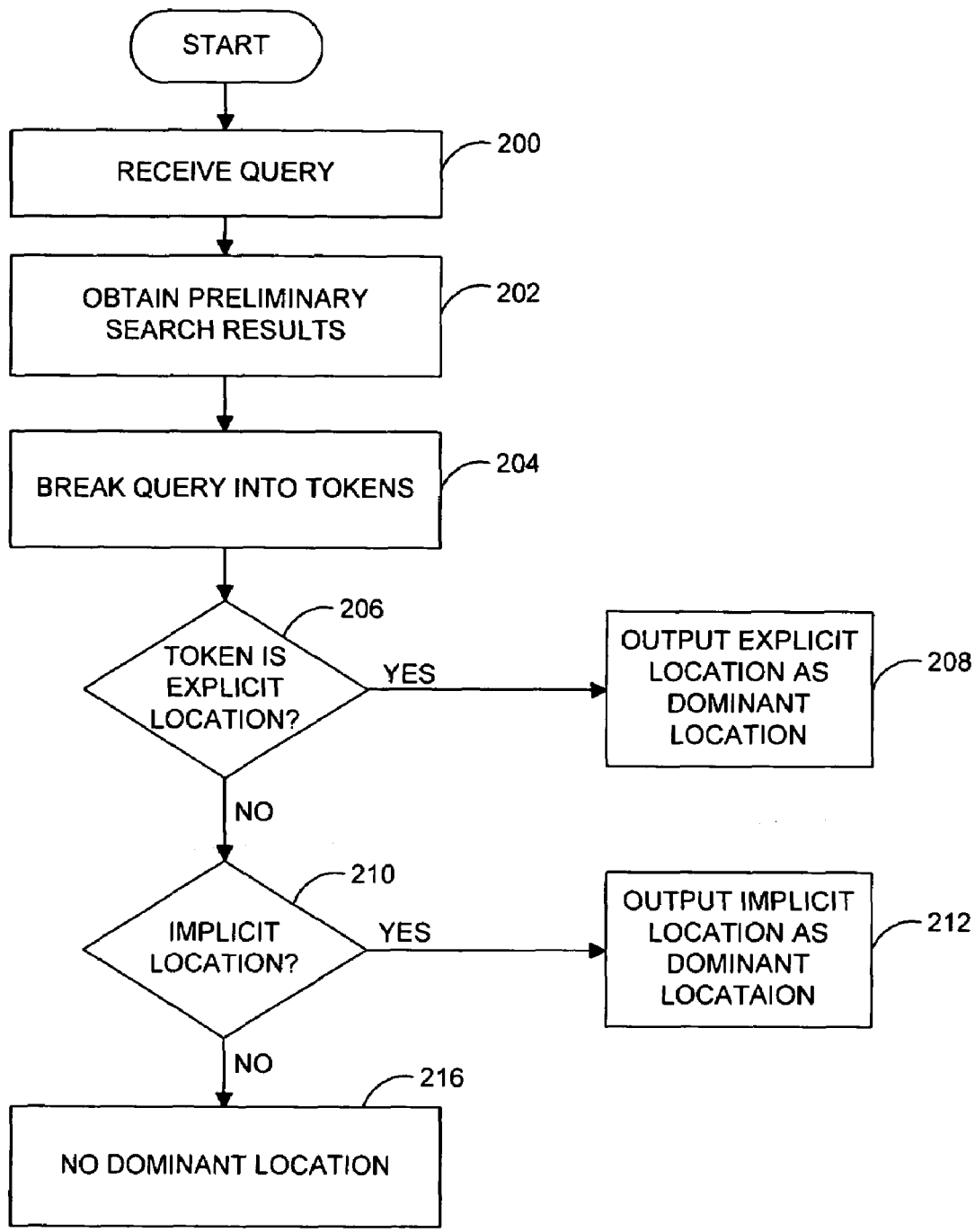
FIG. 2 is a flow chart illustrating a method for performing a search, in accordance with an embodiment of the present invention.

As shown in FIG. 2, a method for performing a search may begin in step 200, wherein a query is received. The query may be, for example, input by a user of a computer system. The received query may contain an explicit location, an implicit locations, or no location.

In step 202, a search engine generates search results, based on the query. The search results are generated, for example, using searching techniques that are known in the art or using any other appropriate searching technique. The searching technique used to obtain the search results may not necessarily incorporate location-based search techniques, and the search results may not necessarily be location-specific. In one implementation, the search results obtained are the "top," or most popular, search results.

In step 204, the query is broken into one or more tokens. Each token includes, for example, one or more terms in the original query. As a particular example, the query "Kentucky Fried Chicken in Seattle" might be broken into the tokens "Kentucky Fried Chicken," "in," and "Seattle." In step 204, the query is broken into tokens, for example, by analyzing the search results to determine which terms in the query are used together most frequently. Step 204 may comprise, for example, an algorithm that uses a recursive process to obtain a tokenized version of the original query. One method of breaking the query into tokens will be described further with reference to FIG. 3.

In step 206, it is determined whether any of the tokens constitutes an explicit location. In some embodiments, only tokens that are equivalent to a location name will be considered to constitute an explicit location, while tokens that contain a location name along with other terms will not be considered to constitute a an explicit location. As a particular example, the token "Kentucky Fried Chicken" does not constitute an explicit location, because the token as a whole is not equivalent to a location name. The token "Seattle" does constitute an explicit location, because the token as a whole is equivalent to a location name.

Breaking the query into tokens in step 204 is performed in such a way that any explicit location most likely constitutes a complete token. This ensures that explicit locations are most likely recognized by the algorithm.

In some implementations, the breaking the query into tokens in step 204 is performed in such a way that any false locations are most likely contained inside a larger token. This ensures that false locations will most likely not be recognized by the algorithm.

If one of the tokens constitutes an explicit location, the explicit location is returned as the dominant location in step 208.

If none of the tokens constitutes an explicit location, it is determined in step 210 whether the query contains any implicit locations. For example, detect an implicit location may include analyzing other data sources, such as top search results (a list of web page links and descriptions) and those web pages previous users have visited from the query. A method for determining whether a query contains implicit locations is described, for example, in Applicants' co-pending U.S. patent application entitled "Method and System for Web Resource Location Classification and Detection," Ser. No. 11/081,014, filed Mar. 10, 2005, which is incorporated herein by reference in its entirety.

If the query contains an implicit location, the implicit location is returned as the dominant location in step 212. If the query does not contain any implicit locations, the query does not have a dominant location, and the method returns in step 214.

Figure 3:
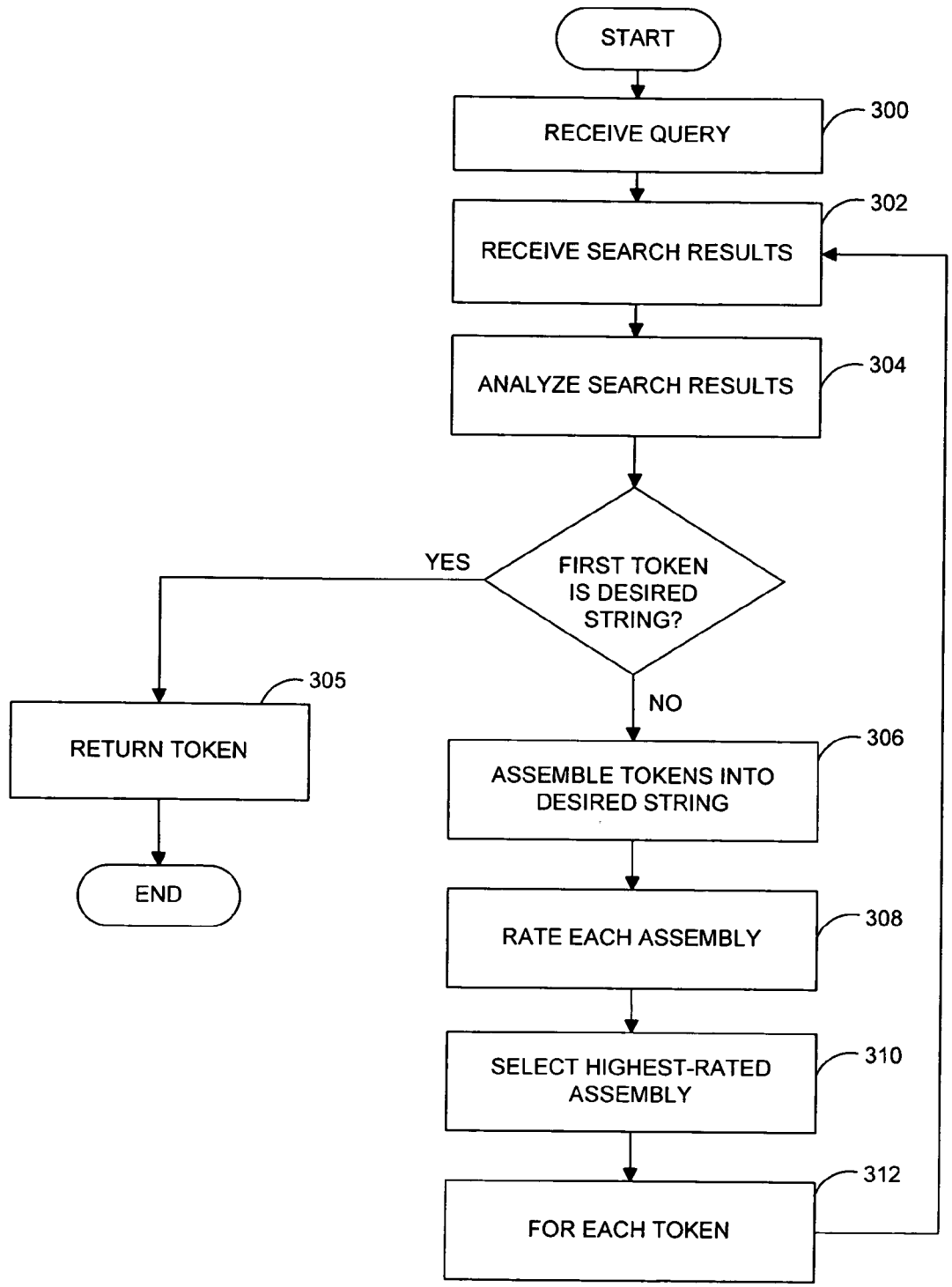
FIG. 3 is a flow chart illustrating a method for tokenizing a query, in accordance with an embodiment of the present invention.

FIG. 3 is a flow chart illustrating a method for breaking a query into tokens. The method may begin in step 300, wherein a query is received, and continue in step 302, wherein search results are received. The query and the search results may be received, for example, from a search engine that generated the search results based on the query. While the search results are based on the query, the search results need not be extensive. The search results may be a relatively short list of search results, such as a sample of search results, a list of cached search results, a list of most popular search results, or the like. In one particular implementation, the search results received are the top search results based on the query.

In step 304, the search results are analyzed. Analyzing the search results 304 includes, for example, examining the search results to determine the presence of tokens in the search results. For example, an analysis of the search results might yield the following:

| Token | Token Frequency (No.) | Token Frequency (percentage) |
|---|---|---|
| kentucky fried chicken | 16 | 31.37% |
| kentucky fried | 11 | 21.57% |
| Seattle | 8 | 15.69% |
| Chicken | 7 | 13.73% |
| in seattle | 4 | 7.84% |
| ... | ... | ... |
| Total | 51 | 100% |

If the token with the highest frequency is equivalent to the desired string, in this case the entire query, the desired string is not breakable. In this case, the query consists of exactly one token, and the token is returned 305 as the tokenized query.

If the token with the highest frequency is not equivalent to the desired string, in this case the entire query, the desired string is breakable, and the method continues in step 306.

In the example given above, the desired string is "kentucky fried chicken in seattle," and the token with the highest frequency is "kentucky fried chicken." Thus, the token with the highest frequency is not equivalent to the desired string, and the method continues in step 306.

In step 306, tokens are assembled into a desired string, in the initial case, the entire query. Step 306 results in a list of one or more assemblies, each assembly being a collection of tokens that together make up the query or other desired string. The assemblies are generated in a greedy fashion, by selecting at each point the useful token with the highest token frequency. For example, the token "kentucky fried chicken" will initially be selected because it has the highest token frequency. Tokens containing the words "kentucky," "fried," and "chicken" are no longer useful. From the list of useful tokens, the token "seattle" is selected because it has the highest token frequency. This method continues until the desired string, in the initial case the entire query, is assembled from the tokens.

Once one assembly has been generated in a such a fashion, a second assembly may be generated, starting with the token with the highest token frequency that has not yet been used in an assembly. In the example given above, a second assembly beginning with the token "kentucky fried" will be generated. In this way, a plurality of assemblies may be generated. In some cases, only one assembly will be generated, while in other cases, two or more assemblies may be generated.

In step 308, each assembly is rated. Rating an assembly may include, for example, summing the token frequencies of each token in the assembly. For example, step 306 may result in a list of assemblies including the following two assemblies, where "/" denotes a token boundary:

1) kentucky fried chicken/in/seattle
2) kentucky fried/chicken/in seattle

These assemblies may be rated by summing the token frequencies of the component tokens, as follows:

1) 31.37%+0%+15.69%=47.06%
2) 21.57%+13.73%+7.84%=43.14%

In step 310, the assembly with the highest rating is selected. In step 312, for each other tokens in the selected assembly the method returns step 302. This includes, for example, treating each token as a desired string. Each token may be passed to the search engine as a search query, and search results for each may be received in step 302. The search results are then analyzed for sub-tokens in step 304. If the sub-token with the highest frequency is equivalent to the desired string, in this case the token, the token is not further breakable, and the token is returned 305 to be included in the tokenized query.

For example, for the assembly "kentucky fried chicken/in/seattle," each token may be passed back to the search engine as a search query. The token "kentucky fried chicken" is passed to the search engine and is now the desired string. The search results are analyzed and it is determined that the sub-token that occurs most frequently is "kentucky fried chicken." Since the sub-token that occurs most frequently is equal to the desired string, the token is not further breakable, and the token will be included in the tokenized query.

The output of the method is an assembly of tokens to form the original query. None of the tokens in the output is further breakable, that is, the highest sub-token for each of the tokens is itself.

Figure 4:
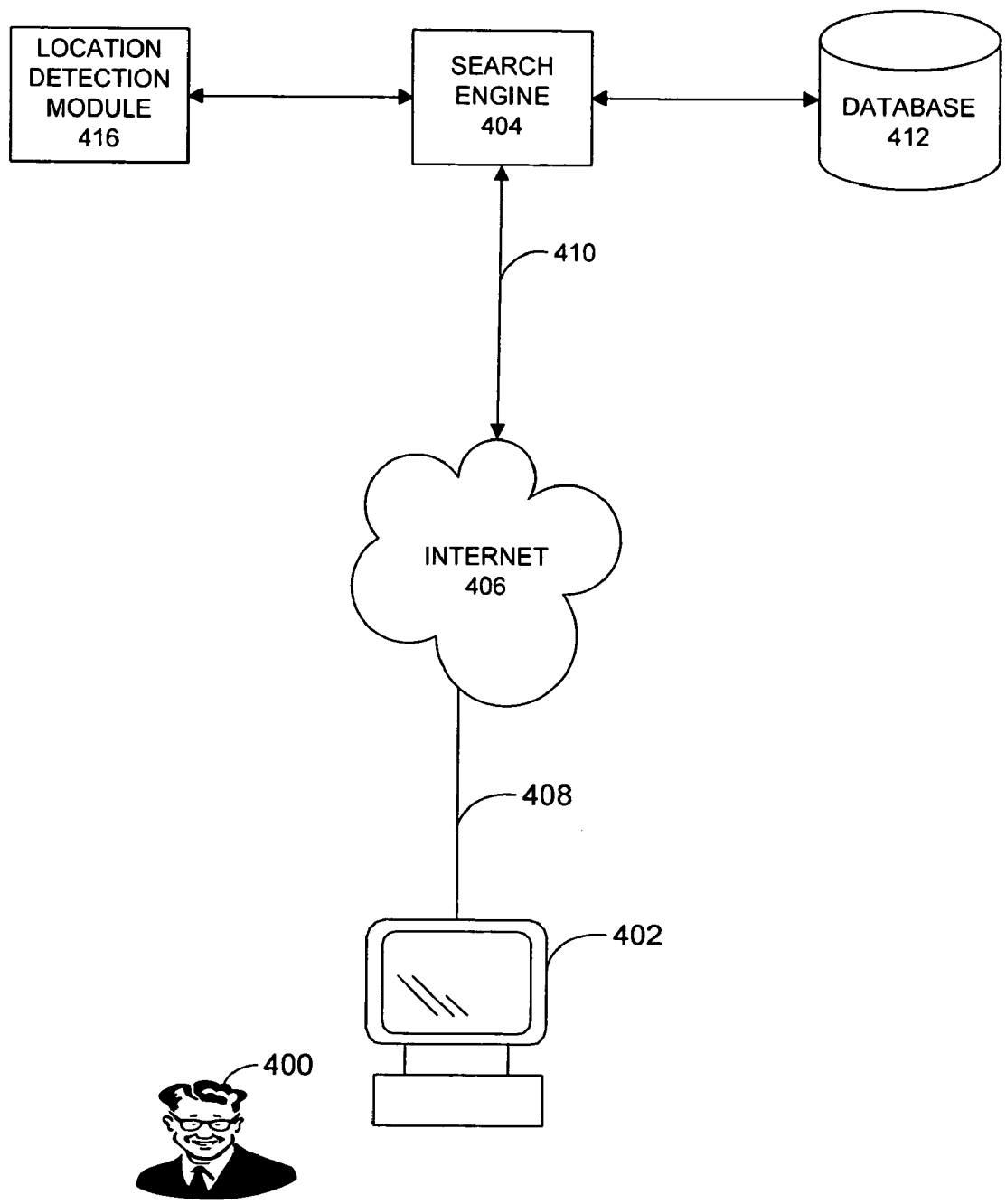
FIG. 4 is a block diagram illustrating an overview of a system in accordance with an embodiment of the present invention.

FIG. 4 is a block diagram illustrating a system for implementing the present invention, in accordance with an embodiment of the present invention. As shown in FIG. 4, in an embodiment of the present invention, data and other information and services for use in the system is, for example, input by an end user 400 via a terminal 402. The terminal 402 is coupled to a search engine 404 via a network 406, such as the Internet, via couplings 408, 410.

The terminal 402 is, for example, a personal computer (PC), minicomputer, mainframe computer, microcomputer, telephone device, personal digital assistant (PDA), or other device having a processor and input capability.

In operation, the user 402 inputs data, such as a query, into the terminal 402. The query is transmitted to the search engine 404, and the search engine 404 obtains search results. The search engine 404 may obtain search results, for example, from one or more databases 412, which are incorporated into or in communication with the search engine 404. The search engine may also obtain search results in conjunction with a location detection module 416, which identifies one or more locations contained in or otherwise specified by the query. The location detection module 416 may be incorporated into or in communication with the search engine 404.

Figure 5:
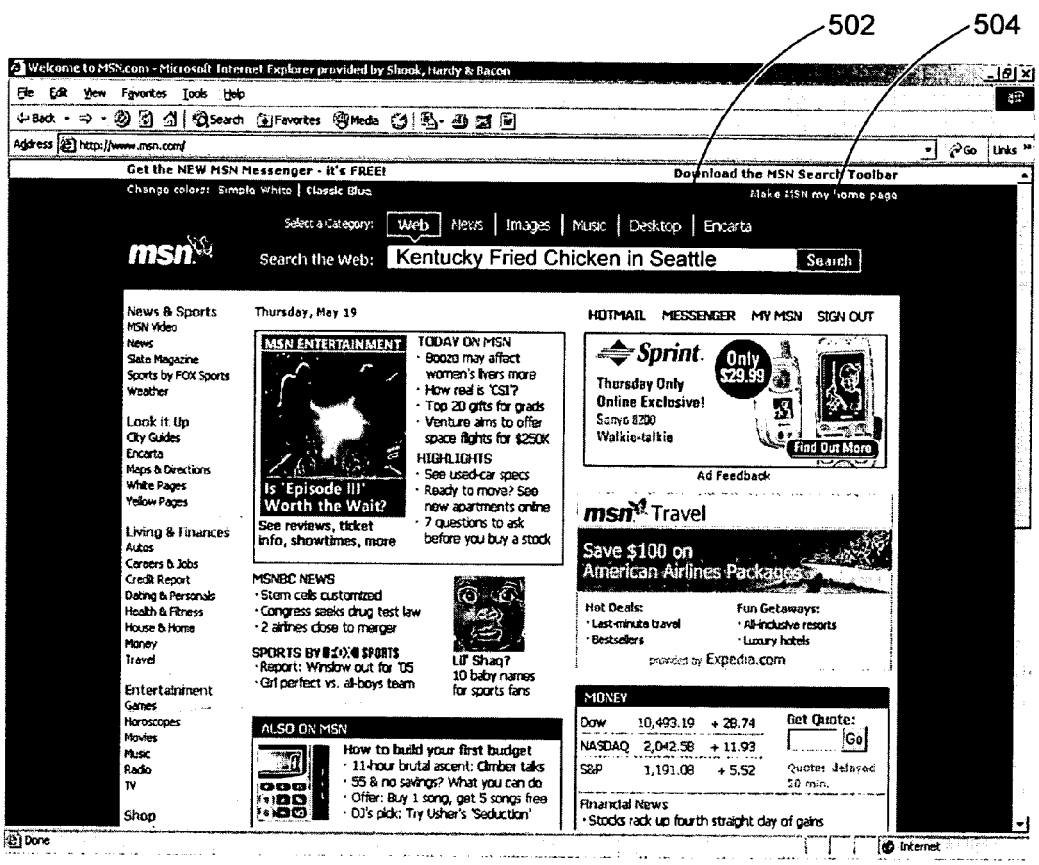
FIG. 5 is an exemplary graphical user interface (GUI) screen that may be presented to a user, in accordance with an embodiment of the present invention.

FIG. 5 is exemplary graphical user interface (GUI) screens that may be presented to a user, in accordance with an embodiment of the present invention. As shown in FIG. 5, a user may enter a query, for example, into a GUI screen 500 using a text box 502. The query may include, for example, an explicit location, an implicit location, no location. The user may submit the query to a search engine, for example, by pressing an "enter" key (not shown), by clicking a "search" button 504, or by some other method. The search engine may obtain one or more search results, which may be used, for example, to find a dominant location for the query.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. One or more computer-storage media with computer-executable instructions embodied thereon for performing a method for tokenizing a query, the method comprising:

receiving a query; wherein the query is one or more terms submitted to a search engine for returning a list of web pages related to the one or more terms;

receiving search results based on the query;

breaking the query into one or more tokens, wherein each token includes one or more terms from the query;

analyzing the search results to determine the frequency of the one or more tokens from the query in the search results, wherein the frequency is a number of times the token is found in the search results; and generating a first assembly that includes a first token having the highest frequency, if one or more useful tokens remain after the first token is added to the first assembly, then adding a second token to the first assembly that is useful and has the highest remaining frequency among the one or more useful tokens, if one or more useful tokens remain after the first token and the second token are added to the first assembly, then adding a third token to the first assembly that is useful and has the highest remaining frequency among the one or more useful tokens, adding further tokens starting with a useful token having with the highest remaining frequency until the collection of tokens in the first assembly contains all terms in the query, wherein the useful token only contains query terms yet to be included in the first assembly; and storing the first assembly in a data store.

2. The media of claim 1, further comprising:

generating a second assembly that includes a fourth token having the second highest frequency, if one or more useful tokens remain after the fourth token is added to the second assembly, then adding a fifth token to the second assembly that is useful and has the highest remaining frequency among the one or more useful tokens, if one or more useful tokens remain after the fourth token and the fifth token are added to the second assembly, then adding a sixth token to the second assembly that is useful and has the highest remaining frequency among the one or more useful tokens, adding further tokens starting with the useful token having the highest remaining frequency until the collection of tokens in the second assembly contains all terms in the query; and storing the second assembly in the data store.

3. The media of claim 2, further comprising:

rating each assembly based on the search results by summing the token frequencies of each token in the assembly.

4. The media of claim 3, further comprising:

selecting the highest-rated assembly.

5. The media of claim 4, wherein the highest-rated assembly is included in the tokenized query.

6. The media of claim 5 further comprising:

determining whether one of the tokens within the tokenized query is an explicit location, wherein a token is an explicit location if it is a location name; and if one of the tokens is an explicit location, returning the explicit location as a dominant location for the query.

7. The media of claim 6, further comprising:

determining whether the tokenized query contains an implicit location.

8. The media of claim 7, further comprising:

if the tokenized query contains an implicit location, returning the implicit location as a dominant location for the query.

9. The media of claim 8, wherein determining whether the tokenized query contains an implicit location comprises:

analyzing search results.

* * * * *